United States Patent [19]

Bridge et al.

[11] Patent Number: 4,615,789
[45] Date of Patent: Oct. 7, 1986

[54] HYDROPROCESSING REACTORS AND METHODS

[75] Inventors: Alan G. Bridge, El Cerrito; Bruce E. Stangeland, Berkeley, both of Calif.

[73] Assignee: Chevron Research Company, San Francisco, Calif.

[21] Appl. No.: 638,810

[22] Filed: Aug. 8, 1984

[51] Int. Cl.⁴ ............................................. C10G 45/00
[52] U.S. Cl. .................................. 208/143; 208/209; 422/216; 422/219
[58] Field of Search .............. 422/129, 188, 189, 190, 422/191, 192, 193, 194, 195, 211, 212, 214, 216, 219; 208/144, 145, 143, 209–213; 436/159

[56] References Cited

U.S. PATENT DOCUMENTS

| | | | |
|---|---|---|---|
| 3,091,586 | 5/1963 | Pappas et al. | 208/210 |
| 3,112,256 | 11/1963 | Young et al. | 208/213 |
| 3,328,292 | 6/1967 | Shambaugh | 422/219 |
| 3,617,525 | 11/1971 | Moritz et al. | 208/211 |
| 3,658,611 | 4/1972 | Wilson et al. | 208/211 |
| 3,830,731 | 8/1974 | Reed, Jr. et al. | 208/211 |
| 3,902,991 | 9/1975 | Christensen et al. | 208/211 |
| 4,087,252 | 5/1978 | Strahorn et al. | 23/288 R |
| 4,173,528 | 11/1979 | Frayer et al. | 208/210 |
| 4,434,045 | 2/1984 | Vernon et al. | 208/107 |

*Primary Examiner*—Frank Sever
*Attorney, Agent, or Firm*—S. R. LaPaglia; W. K. Turner; P. L. McGarrigle, Jr.

[57] ABSTRACT

A multiple bed downflow hydrocarbon hydroprocessing reactor is modified by the addition of a phase separator above at least one of the catalyst beds. This enables the lighter fraction of the hydrocarbon, which has passed through the upper bed(s) in the vapor phase and thus not been heavily hydroprocessed, to be hydroprocessed in the absence of the liquid heavier fraction in the same reactor.

15 Claims, 2 Drawing Figures

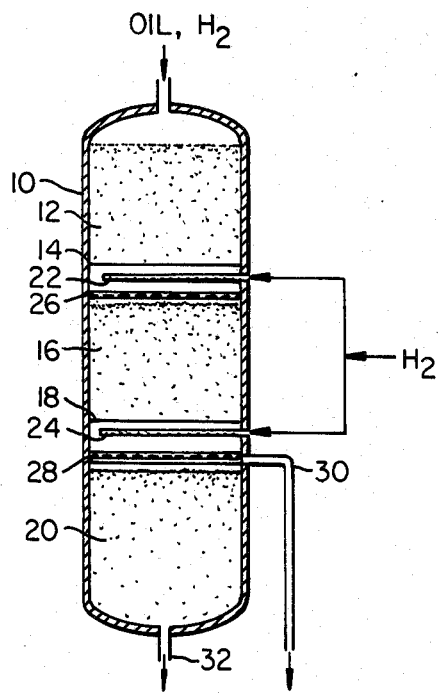
FIG._1.
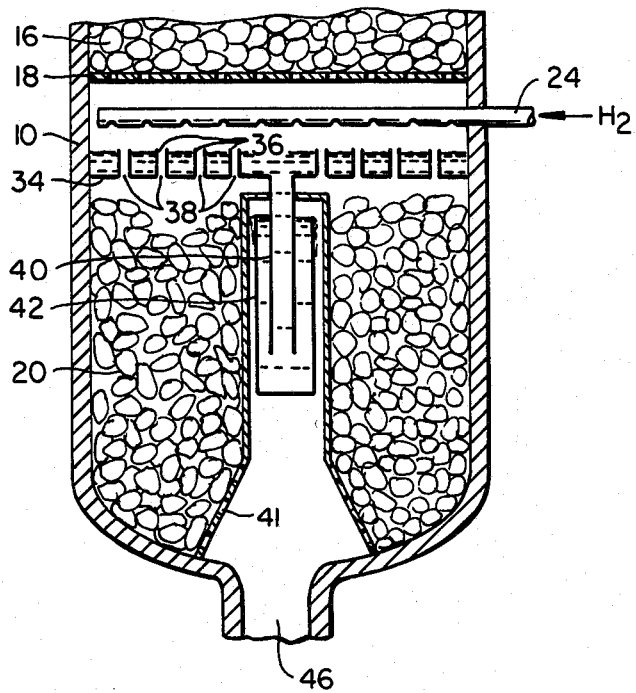
FIG._2.

HYDROPROCESSING REACTORS AND METHODS

FIELD OF THE INVENTION

This invention relates in general to hydroprocessing reactors and methods. In particular, it relates to multiple bed downflow reactors for the catalytic hydroprocessing of hydrocarbons in which not all of the hydrocarbons contact every bed, and to hydroprocessing methods employing such reactors.

BACKGROUND OF THE INVENTION

The technique of hydroprocessing of hydrocarbons has been known and used for many years. By hydroprocessing is meant the reaction with hydrogen, usually in the presence of a catalyst, of a feedstock. Typical hydroprocessing processes include hydrodesulfurization, hydrodenitrification, hydrodemetalation, and hydrocracking; and two or more of these processes may be carried on in the same reactor, either in the same or different catalytic beds. Although hydroprocessing may be applied to any hydrocarbon feedstock, it is particularly applicable, though less easily applicable, to heavier feedstocks such as residua, vacuum and atmospheric gas oils, coal and shale liquids, etc., since these feedstocks typically contain higher concentrations of less easily removed contaminants.

It has been found that when hydrocarbon fractions having a wide boiling range, especially residua, etc., are hydroprocessed, the heavier and more polar fractions tend to dominate the hydroprocessing reaction, so that the lighter fractions are less completely reacted. This is believed to be because the heavier fractions are preferentially absorbed onto the catalyst surface and into the pores, leaving less catalytic surface area available for the lighter and less polar molecules. Thus, though the lighter molecules may be more readily hydroprocessed, e.g., to a lower sulfur content, if processed alone, they will not be as efficiently processed if heavier molecules are present. More extensive hydroprocessing, with a concomitant increase in hydrogen consumption, is thus necessary to achieve adequate treatment in the same reactor.

Various methods have been proposed to solve this problem. For example, an alternative for atmospheric residuum desulfurization is to vacuum distill the residuum and desulfurize the gas oil and vacuum residuum separately. See, e.g., U.S. Pat. Nos. 3,830,731 to Reed et al. and 3,902,991 to Christensen et al. These, however, require two reactors (and associated equipment) rather than one, and also require a vacuum distillation column. Wilson et al., U.S. Pat. No. 3,658,681, employ a single reactor with two feed streams, one downward through the upper beds and the other upward through the lower beds. Other multiple reactor techniques are shown in U.S. Pat. Nos. 3,617,525 to Moritz et al. and 4,173,528 to Frayer et al. Pappas et al., U.S. Pat. No. 3,091,586, show a multiple bed reactor with a single feed but multiple withdrawal points for intermediate effluents. Vernon et al., U.S. Pat. No. 4,434,045, show a hydrocracking technique where a light fraction is hydrotreated to provide a recycle donor solvent. The disclosures of these and other patents cited herein are incorporated herein by reference.

With the decreasing demand relative to predictions for petroleum products, many refineries are now operating below design capacity. Accordingly, it would be uneconomic in many instances to add additional hydroprocessing equipment, even though environmental regulations require steadily decreasing sulfur, etc., levels in fuels. A hydroprocessing technique that would improve overall efficiency without substantial capital or operations expenditure would thus be desirable.

SUMMARY OF THE INVENTION

In a first aspect, this invention provides a downflow hydrocarbon hydroprocessing reactor having a plurality of vertically spaced catalyst beds, the improvement wherein which comprises a liquid/vapor separator placed between two of the catalyst beds, the separator comprising a bypass means so arranged that liquid separated by the separator will enter the bypass means and not contact the catalyst bed or beds below the separator while the vapor separated by the separator will pass through the catalyst bed or beds below the separator.

In a second aspect, this invention provides a method for hydroprocessing hydrocarbons using the reactor of this invention.

BRIEF DESCRIPTION OF THE DRAWINGS

FIG. 1 is a cross-section of a three-bed downflow hydroprocessing reactor according to this invention, while FIG. 2 is a cross-section of the lower part of a reactor showing a mode of practice of this invention.

DETAILED DESCRIPTION OF THE INVENTION

In a reactor according to this invention, hydrocarbons such as atmospheric and vacuum residua, atmospheric, vacuum and coker gas oils, shale oil, coal liquids, etc., are hydroprocessed over a series of catalyst beds. The lower boiling components contact all of the catalyst beds, while the higher boiling components contact some, but not all, of the beds. This allows the lower boiling components, which have proceeded through the upper catalyst beds in the vapor phase and thus have not been as strongly hydroprocessed as the heavier components, to be hydroprocessed alone. The separation of the higher and lower boiling components is performed by a phase separator, which replaces one of the distributors located between the catalyst beds. The separator may be a modified distributor, as will be discussed later, or may be especially designed for the purpose. The higher boiling components which bypass the lower catalyst bed(s) may, but need not, be recombined with the lower boiling components following their hydroprocessing on the lower catalyst beds.

Since the reactor of this invention is basically the same as a conventional hydroprocessing reactor, with the exception of the phase separator replacing a distributor, this invention is particularly applicable to existing hydroprocessing reactors, especially when operated below design capacities.

Typical hydroprocessing conditions in which the reactor and process of this invention may be advantageously employed include: for hydrodesulfurization, hydrodenitrification, and hydrodemetalation; temperature, 200°–480° C., typically 370°–450° C.; pressure, 3.45–34.5 MPa; LHSV, 0.2–20; and hydrogen consumption, 50–500 NL/L. The catalysts employed will typically be a composite of a Group VIb metal or compound and a Group VIII metal or compound supported on a refractory base such as alumina or silica-alumina. Such catalysts are well-known in the art and include alumina supported cobalt-molybdenum, nickel sulfide, tungsten-nickel sulfide, cobalt molybdate and nickel molybdate. For hydrocracking, typical operating conditions include: temperature, 200°–510° C.; pressure, 3.45–34.5 MPa; LHSV, 0.1–15; and hydrogen consumption, 125–500 NL/L. The catalysts will typically be Group VIb, VII, and/or VIII metals or oxides or sulfides thereof supported on a refractory base such as silica-alumina or alumina. Examples are oxides or sulfides of Ni, Co, Mo, W, V, and Cr supported on such bases. Other conditions, except for such changes as may be dictated by the altered processing environment, will be as usual for the technique concerned.

The bed fraction devoted to lower boiling hydrocarbon processing will generally be 10 to 50 percent of the total bed volume. The catalysts may be the same throughout the whole reactor, or may be different, as suits the proposed process. For example, the lower bed catalyst may not need to be as resistant to fouling as the upper bed catalyst, since it will not encounter the heaviest, usually most contaminated, hydrocarbons.

Advantages of the use of the reactor and process of this invention include:

1. A reduction in distillate nitrogen and sulfur levels when hydrocracking or hydrotreating residua, thereby simplifying further upgrading.

2. A reduction in aromatic levels in diesel and jet fuel products in gas oil hydrocracking and hydrotreating, thereby increasing their value.

3. A removal of mercaptan and other trace sulfur compounds from the heavy naphtha produced in distillate hydrocracking, thereby allowing direct feed to a catalytic reformer.

4. The addition of light oil in the jet fuel boiling range to a heavier oil feedstock to refine it to a greater extent than would be possible without the internal phase separation feature.

5. The ability to upgrade, in situ, the light products formed by cracking a heavy feedstock. In conventional reactors, the light products enter the vapor phase and cannot compete for catalytic sites with the remaining heavy oil.

These advantages can be achieved relatively simply and inexpensively even with an existing reactor.

The following Figures exemplify preferred embodiments of this invention, but are not intended to limit the invention to the embodiments shown.

FIG. 1 is a cross-section of a three-bed down-flow hydroprocessing reactor according to this invention. Reactor shell 10 contains three vertically spaced catalyst beds, upper bed 12 supported on support 14, middle bed 16 supported on support 18, and lower bed 20. Quench rings 22 and 24 between the beds allow for the introduction of quench hydrogen. The liquid hydrocarbon effluent from the upper bed 12 is redistributed by distributor 26 before passing onto the middle bed 16. Distributor 26 may be of any suitable type to achieve an adequate distribution of the liquid hydrocarbon over the upper surface of bed 16, e.g., a chimney tray, trough tray, or the like. Typical distributors are shown in U.S. Pat. Nos. 3,112,256 to Young et al. and 4,087,252 to Strahorn et al. The hydrocarbon effluent from the middle bed 16 is separated by phase separator 28, typically a modified distributor, and the liquid phase bypasses lower bed 20 by means of conduit 30. The vapor phase flows down through lower bed 20, and exits the reactor through conduit 32. In the arrangement shown in this Figure, the vapor phase effluent and liquid phase effluent leave the reactor through separate conduits, but these effluents may be combined if desired.

FIG. 2 is a cross-section of the lower part of a reactor according to this invention, showing an embodiment of a separator in greater detail. In this Figure, the phase separator is shown as a modified chimney tray. The tray 34 is provided with an array of chimneys 36 projecting upward. In a normal chimney tray, these chimneys would be slotted to allow liquid hydrocarbon to flow through holes 38 in the tray onto the catalyst bed below. However, in this modified tray, though vapor can flow through holes 38, the liquid flows through a downpipe 40 into a dipleg bucket 42. This arrangement enables the pressure drop in the tray to be adjusted so that the pressure drop experienced by the liquid phase as it bypasses the lower bed 20 is close to that experienced by the vapor phase as it passes through bed 20. The liquid flows down the outside of the dipleg bucket 42. A tube 41, perforated near the bottom, surrounds the dipleg bucket 42 and provides, with the reactor shell 10, an annular space for the lower catalyst bed 20. The vapor phase, flowing through holes 38, passes through and is hydroprocessed in bed 20, and then flows through the perforations in tube 41 to mix with the liquid phase from the dipleg bucket 42 and exit through conduit 46.

While these Figures have illustrated possible arrangements for the hydroprocessing reactor of this invention, it will be obvious to one skilled in the art having regard to this disclosure that other distributors, phase separators, pressure equalizing arrangements, etc., are equivalent in function to those shown. Such equivalents are to be considered as coming within the scope of the invention, which is limited only by the claims and their lawful equivalents.

What is claimed is:

1. In a downflow hydrocarbon hydroprocessing reactor containing a plurality of vertically spaced catalyst beds, the improvement which comprises:
   means for increasing the contacting time between hydrocarbon vapor and the catalyst including;
   a liquid/vapor separator placed between two of the catalyst beds, the separator comprising a bypass means so arranged that liquid separated by the separator will enter the bypass means and not contact the catalyst bed or beds below the separator while the vapor separated by the separator will pass through the catalyst bed or beds below the separator.

2. The reactor of claim 1 wherein the separator is placed above the lowermost catalyst bed.

3. The reactor of claim 1 wherein the volume of the catalyst bed or beds below the separator is between 10 and 50 percent of the total volume of the catalyst beds.

4. The reactor of claim 1 wherein the bypass means comprises pressure regulating means for regulating the pressure drop in the conduit to approximately the same value as the pressure drop in the catalyst bed or beds below the separator.

5. The reactor of claim 1 wherein the separator comprises a chimney tray.

6. The reactor of claim 1 wherein the bypass means is connected to the reactor to recombine the separated liquid and vapor below the lowest catalyst bed.

7. In a method for hydroprocessing hydrocarbons by passing them downwardly through a reactor containing a plurality of vertically spaced catalyst beds, the improvement which comprises:

increasing the contacting time between hydrocarbon vapor and the catalyst by;

separating the downflowing hydrocarbons into liquid and vapor phases by a liquid/vapor separator positioned between two of the catalyst beds, causing the vapor phase to pass through the catalyst bed or beds below the separator, and causing the liquid phase to bypass the catalyst bed or beds below the separator so that only the vapor phase is hydroprocessed by the catalyst bed or beds below the separator.

8. The method of claim 7 wherein the separator is placed above the lowermost catalyst bed.

9. The method of claim 7 wherein the volume of the catalyst bed or beds below the separator is between 10 and 50 percent of the total volume of the catalyst beds.

10. The method of claim 7 wherein the liquid phase bypassing the catalyst bed or beds is caused to undergo a pressure drop approximately the same as that undergone by the vapor phase which passes through the catalyst bed or beds.

11. The method of claim 7 wherein the separator comprises a chimney tray.

12. The method of claim 7 wherein the conditions under which the hydroprocessing occurs include a pressure between 3.45 and 34.5 Mpa and a temperature between 370° and 450° C.

13. The method of claim 7 wherein the hydrocarbon being hydroprocessed is selected from the group consisting of atmospheric residum, vacuum residuum, atmospheric gas oil, vacuum gas oil, coker gas oil, shale oil, coal liquids, and mixtures thereof.

14. The method of claim 7 wherein the liquid phase which has bypassed the catalyst bed or beds is recombined with the vapor phase which has passed through the catalyst bed or beds and been hydroprocessed.

15. In a downflow hydrocarbon, hydroprocessing reactor which contains a plurality of vertically spaced catalyst beds, the improvement comprises:

means for increasing the contacting time between hydrocarbon vapor and the catalyst including;

means for separating the liquid hydrocarbon fraction from the vapor hydrocarbon fraction, said means being placed downstream of at least one catalyst bed and upstream of at least one catalyst bed;

means for removing said liquid hydrocarbon fraction from the reactor so that said liquid hydrocarbon fraction does not contact any more catalyst beds;

means for passing the vapor fraction through another catalyst bed for further hydrofining.

* * * * *